United States Patent [19]

Fancher

[11] Patent Number: 5,128,755
[45] Date of Patent: Jul. 7, 1992

[54] WIRELESS REAL TIME VIDEO SYSTEM AND METHOD OF MAKING SAME

[75] Inventor: Philip D. Fancher, Channel Islands, Calif.

[73] Assignee: Wireless Technology, Inc., Las Vegas, Nev.

[21] Appl. No.: 557,896

[22] Filed: Jul. 25, 1990

[51] Int. Cl.$^5$ ............................................. H04N 7/18
[52] U.S. Cl. .................................. 358/108; 358/186; 358/83
[58] Field of Search ............ 358/108, 93, 83, 210, 358/186, 161; 343/700 MS

[56] References Cited

U.S. PATENT DOCUMENTS

| | | |
|---|---|---|
| 3,680,136 | 7/1972 | Collings . |
| 3,685,050 | 8/1972 | Cartwright . |
| 3,921,177 | 11/1975 | Munson . |
| 4,054,874 | 10/1977 | Oltman, Jr. . |
| 4,089,003 | 5/1978 | Conroy . |
| 4,125,838 | 11/1978 | Kaloi . |
| 4,367,474 | 1/1983 | Schaubert et al. . |
| 4,521,781 | 6/1985 | Campi et al. . |
| 4,564,858 | 1/1986 | Resch ............................. 358/186 X |
| 4,571,621 | 2/1986 | Dalimonte et al. ................ 358/186 |
| 4,633,262 | 12/1986 | Traut . |
| 4,670,787 | 6/1987 | Levine ............................. 358/161 |
| 4,683,446 | 7/1987 | McDonald . |
| 4,825,457 | 4/1989 | Lebowitz ........................ 358/108 X |
| 4,831,438 | 5/1989 | Bellman, Jr. et al. ........... 358/210 X |
| 4,884,132 | 11/1989 | Morris et al. .................... 358/108 X |

OTHER PUBLICATIONS

Keith R. Carver & James W. Mink "Microstrip Antenna Technology" Jan., 1981; IEEE Transactions on Antennas and Propagation vol. AP-29, No. 1.

Primary Examiner—Victor R. Kostak
Attorney, Agent, or Firm—Nilsson, Robbins, Dalgarn, Berliner, Carson & Wurst

[57] ABSTRACT

A wireless, real time video system provides a low power video transmitter wherein the base band video signal generated by the video camera directly modulates a radio frequency carrier signal to produce a very narrow band transmitter signal that is transmitted through a circularly polarized patch radiating antenna to a receiving antenna at a remote receiver site. The transmitted signal is picked up by the receiver antenna to be passed through a narrow band preselector filter to a low noise amplifier. The amplified signal is then applied to a mixer along with a fixed local oscillator frequency that is demodulated to reconstruct the original base band video signal for use in operating a video monitor or recorder connected by hard wired cable to the receiver unit. Both the transmitter and the receiver employ a phase locked loop and narrow ban filters to confine the transmitted signal and the receiver response within a very narrow frequency band to optimize the transmitter efficiency and prevent generation of and interference from extraneous signals.

24 Claims, 6 Drawing Sheets

WIRELESS REAL TIME VIDEO SYSTEM AND METHOD OF MAKING SAME

BACKGROUND OF THE INVENTION

The present invention relates to a wireless real time video system; and more particularly to a wireless video system operable to transmit video signals using a patch radiating antenna within the confines of a building to fixed video receivers in the 902 through 928 MHz, 2,400 through 2,500 MHz and 5,700 through 5,900 MHz frequency bands.

In the past, because of restrictions imposed by governmental agencies such as the FCC, the use of available wireless video systems that employ standard video technology has been limited to high priority military and governmental operations.

However, in recent years, the need for closed circuit television (CCTV) systems, has greatly expanded in both the private and non-military governmental sectors. Particularly with regard to both overt and covert surveillance operations, there is a need for a protable dependable and well-modulated wireless video surveillance system for stores, manufacturing plants and for use in law enforcement.

Because existing wireless video systems traditionally operate in frequency domains that interfere with other radio frequency transmissions, military and governmental agency use of wireless video has been severely restricted.

Thus, a widespread need exists for a discreet, economical, reliable, wireless video system that can operate within the limitations imposed by government regulation while meeting the diverse demands of business and industry.

Traditional methods of video surveillance systems rely upon hard-wired video transmitter and video receiver installations to provide surveillance. The primary drawback of such hard-wired surveillance systems, particularly in pre-existing facilities, lies in the high cost associated with system installation.

The high cost of installation of a hard-wired video system is directly attributable to the necessity of routing video cables for each monitoring camera location to a central surveillance station. Running cables from the video cameras to the video receiving monitor is particularly costly if done after building construction. Cable routing requirements also hamper the ability to institute and maintain a covert surveillance of a specific area, particularly in high danger situations. In such cases, the video cabling cannot be left exposed to view so the work involved in routing cables through internal building conduits will cause considerable disruption in and around the surveillance area that is difficult to conceal.

Finally, the transmission range of signals from the video cameras to remote viewing locations is limited in the hard-wired video installations because cable length is restricted and the internal routing paths available between the camera and receiver may be excessively long or tortious.

Thus, a wireless video transmission system operable in real time that can be made fully portable to meet the security needs of both public and private sectors for discreet, high quality, affordable surveillance, would serve to resolve many of these problems that limit the uses of current hard-wired systems and meet many long-unsatisfied security needs. Specific areas where such a portable security system would benefit the public include hospitals, retail stores, grocery and drug stores, warehouses, governmental offices, educational facilities and the transportation industry.

SUMMARY OF THE INVENTION

The present invention provides a wireless real time video system which incorporates a microstrip patch radiating antenna for the transmitter and a monopole receiving antenna for a fixed base receiver to provide wireless surveillance of a predetermined area.

The system of this invention provides a fully portable video camera band transmitter for video transmission capable of operating in the currently assigned transmission bands of 902 through 928 MHz, 2,400 through 2,500 MHz, and a 5,700 through 5,900 MHz.

The wireless surveillance system of this invention employs a video transmitter that receives the base band video signal from a video camera. The video transmitter is integrally powered and portable, and operates to retransmit the received video signal at a predetermined frequency within one of the assigned bands through a microstrip patch radiating antenna to a fixed video receiver location where the signal is received by a monopole antenna. The video receiver then transmits the received video signal through a hard-wired cable as a base band video only output signal to a remote video monitor for viewing.

The video transmitter antenna has a microstrip patch radiating design that provides a slot-induced circular polarization in both the horizontal and vertical planes.

BRIEF DESCRIPTION OF THE DRAWINGS

A complete understanding of the present invention and of the above advantages may be gained from a consideration of the following description of the preferred embodiments taken in conjunction with the accompanying drawings in which.

DETAILED DESCRIPTION

The wireless video transmitting system in accordance with the invention, utilizes a microstrip patch radiating antenna transmitting at a preselected frequency within a prescribed radio frequency range from a self-contained video transmitter. The video transmitter is positionable anywhere within, for example, the subfloor of a building, or alternately may be made fully portable to be hand held. The internally powered video transmitter uses the base band video from the video camera to frequency modulate a carrier in the 902 to 928 MHz or other assigned frequency bands for transmission by the microstrip patch antennae.

A fixed position receiver incorporating an external power supply is hard-wired by a coaxial cable to a remote video monitor, and receives via a monopole antenna, the FM signal transmitted from the microstrip patch radiating antenna. The receiver demodulates the signal being received to restore the original video signal that is sent to the remote video monitor where the signal can be observed on the monitor or recorded on a VCR.

This wireless video system is extremely useful for use in any area requiring transportable, fully self-contained portable video surveillance equipment. The wireless video system can be implemented as a retrofit system or constructed into a building without undue hard wiring constraints or positioning problems for the video equipment. The wireless video system functions at such a lower power that is easily incorporated into a building where the walls of the building provide sufficient shielding for the transmitted video signals to eliminate any multipath distortion.

Figure 1:
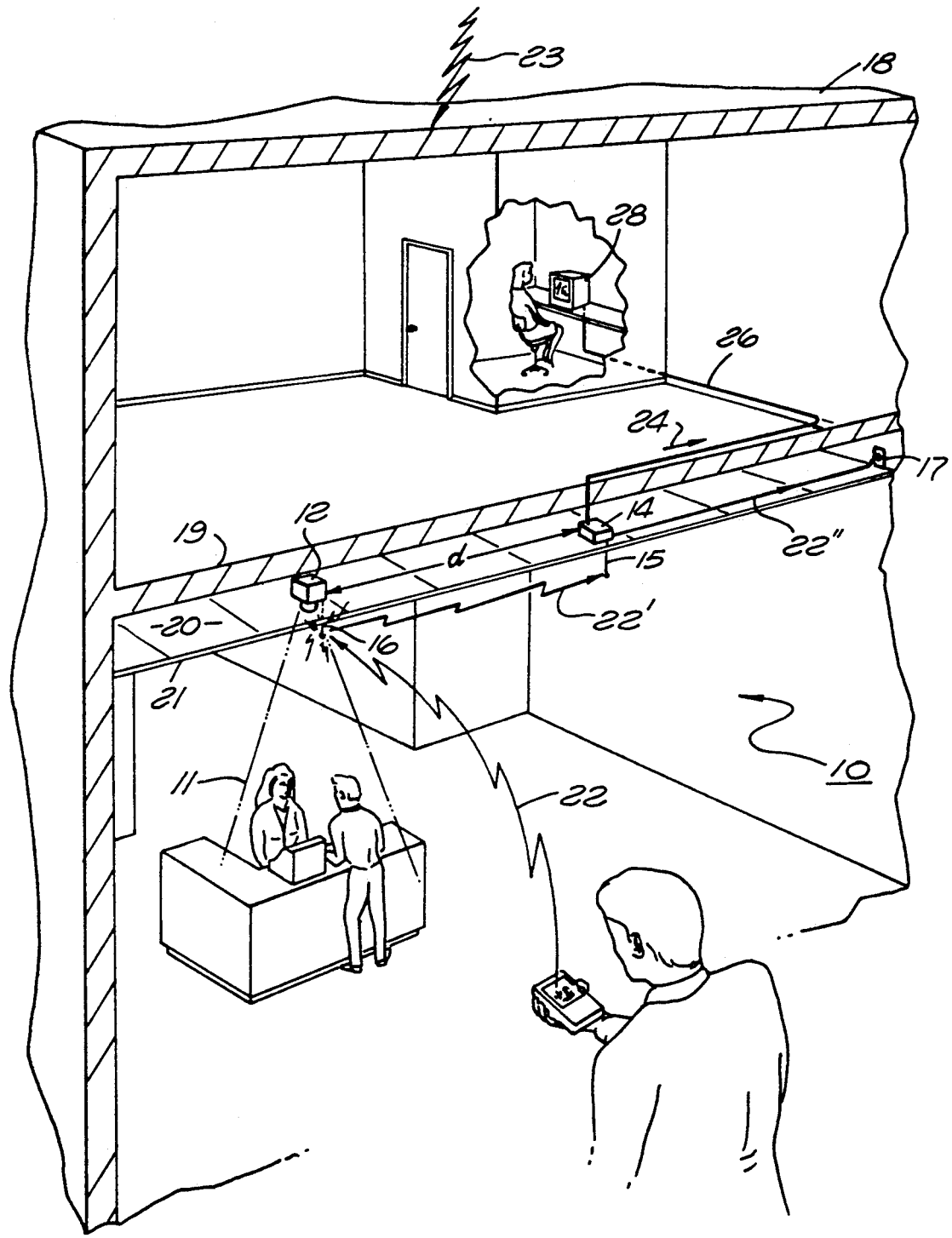
FIG. 1 is schematic representation of a wireless real time video surveillance system in operation incorporating a portable camera and transmitter with hard-wired receivers.

Referring to FIG. 1, the wireless real time video system 10 is used to monitor a surveillance area 11, for example, a cash register location, where the camera produces a signal to be sent through a transmitter 12 positioned above the surveillance area 11. The video transmitter 12 can be positioned at a distance of from 50 to 300 feet from the fixed video receiver 14. In FIG. 1, only one video transmitter 12 is shown, but a networked system may employ any number of portable transmitters 12 multiplexed together.

As shown in FIG. 1, this video transmitter 12 can be fully portable and can in an alternative embodiment be hand held. The microstrip patch radiating antenna 16 of the video transmitter 12 is operable to transmit the video signal 22' on an FM carrier in the frequency range of, for example, 902 to 928 MHz, 2,400 through 2,500 MHz or 5,700 through 5,900 MHz. A monopole antenna 15 for the receiver 14 receives the transmitted video signal 22'. The fixed position receiver 14 is hard-wired through a coaxial cable 26 and has an external power supply 17. The hard-wired intermediate signal 22' is frequency demodulated and amplified by the receiver 14, to be sent as a base band video output through the coaxial cable 26, for example a 75-ohm coaxial cable, to a remote monitor 28.

As shown in FIG. 1, this video system 10 is ideal for incorporation within a building 18 where the walls prevent the stray signal 23 from intefering with the signal 22' from the wireless video transmission. The wireless transmitter 12 and the receiver 14 can then be located in the area 20 between the walls of the building 18, or between the floor 19 and the sub ceiling 21.

Figure 2:
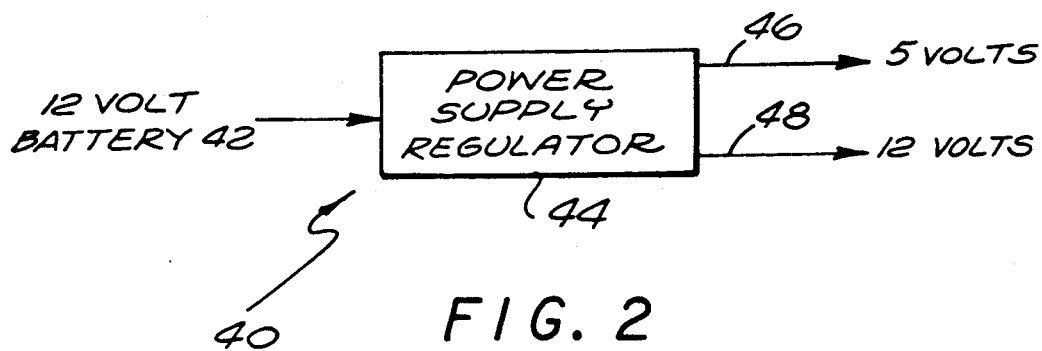
FIG. 2 is a schematic circuit diagram of the power supply system for the wireless real time video system transmitter.

Referring to FIG. 2, the power supply system 40 for the transmitter 12 provides a regulated 12-volt supply from a battery 42. A power supply regulator 44 splits the battery voltage into two distinct voltages at terminals 46 and 48 for use with the transmitter. The voltage at terminal 46 is 5-volts and that at terminal 48 is the full 12-volts. The battery 42 is preferably an externally rechargeable battery having a fully charged voltage of 13.8-volts. This dc voltage stabilization maintains the voltage to the transmitter at a constant value as the battery voltage diminishes over time.

Figure 3:
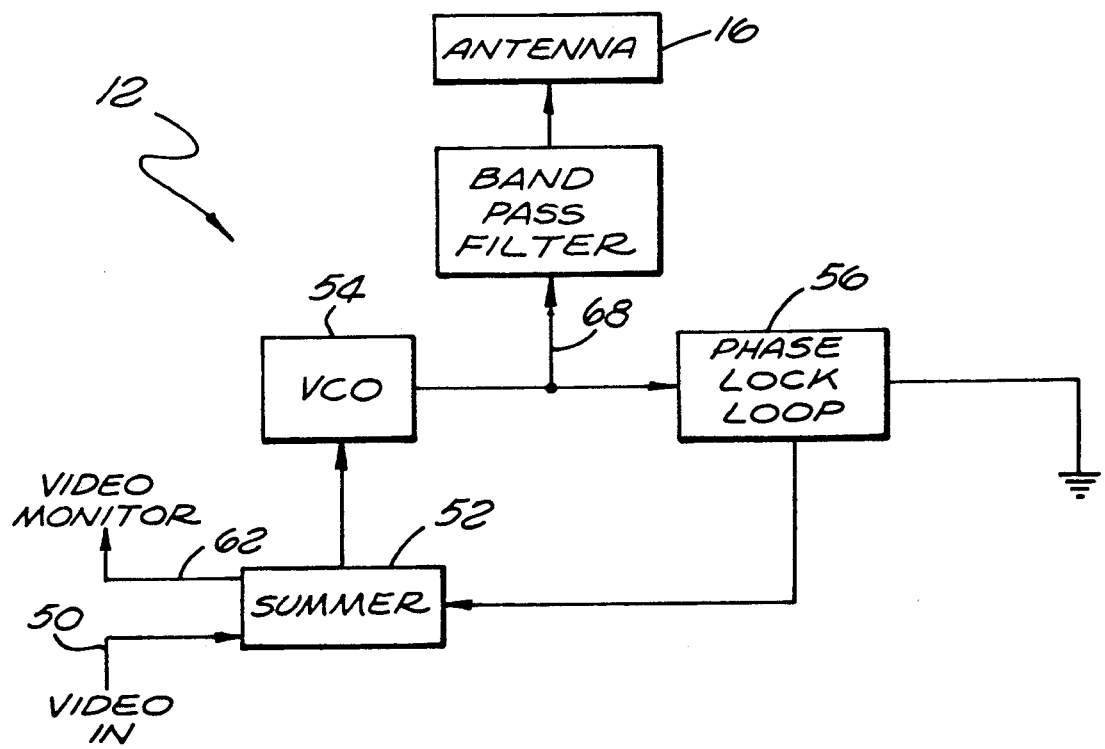
FIG. 3 is a simplified schematic representation block diagram of the video transmitter.

Referring to FIG. 3, the video transmitter 12 basically includes an antenna 16, a voltage control oscillator (VCO) 54 with a phase lock loop (PPL) 56, and a summing circuit 52. During transmission, the video input signal 50 from a surveillance camera (not shown here) is applied to a summer circuit 52 to modulate the control voltage applied to VCO 54, and is also applied to a video monitor jack 62 so the operator can observe the camera field of views during installation and calibration. The VCO control signal from the summer circuit 52 is applied to the VCO 54 to generate the FM signal to be transmitted.

Preferably, instead of generating a local oscillator frequency at the carrier frequency by using successive multiplier stages to step up the crystal oscillator frequency, the VCO output frequency is stepped kept down using a high speed divider to the frequency of the crystal oscillator which operates at 7.047 MHz. In the conventional arrangement, the series of multipliers generate various harmonics that must each be filtered out to meet severe FCC restrictions, whereas stepping down the carrier frequency to the crystal oscillator frequency using a single divider generates just one upper and one lower harmonic that can be easily filtered out.

The phase lock loop 56 precisely controls the carrier frequency generated by the VCO 54 by prescaling and sampling the 915 MHz signal during the black level, back porch portion of the video signal. The VCO output is divided by 128 to reduce its frequency range to that of the crystal oscillator in the phase lock loop 56. The phase lock loop 56 thus generates a phase error feedback that is applied through the summer circuit 52 during the sampling intervals to adjust the frequency of the VCO 54 to the precise carrier frequency during each sampling interval. The modulated output from the VCO 54 is then applied through the band pass filter 58 to remove the unwanted harmonics to be transmitted by the microstrip patch radiating antenna 16.

Figure 4:
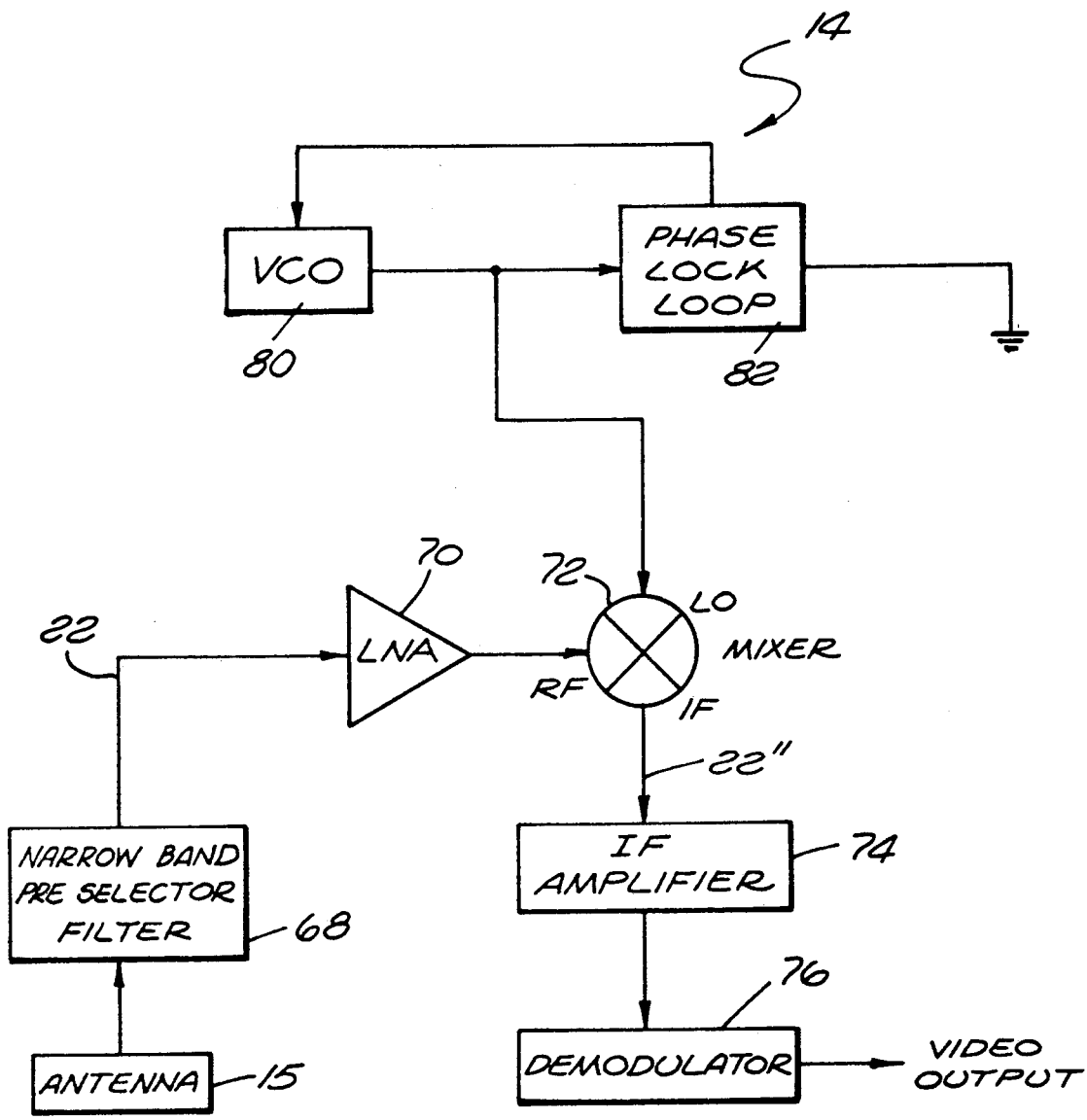
FIG. 4 is a simplified schematic representation block diagram of the video receiver of the wireless real time video system.

Referring now to FIG. 4, the video receiver 14 receives the FM signal 22' from the transmitter 12 through monopole antenna 15. The signal 22' first is applied preferably through a narrow band pre-selector filter 68 with an 8-10 MHz band width to a low noise amplifier 70. The amplified output from the low noise amplifier 70, which is in the range of 915 MHz, is applied to a mixer 72 where it is combined with a local oscillator signal at a frequency of 985 MHz to produce an intermediate frequency signal 22" at 70 MHz.

As shown in FIG. 4, the intermediate frequency signal 22" is applied through an intermediate frequency IF amplifier 74 to a demodulator 76 to restore the original base band video signal. The base band video output from the demodulator 76 can then be recorded by a VCR or applied to the monitor for viewing (not shown here). The local oscillator frequency 22''', which is 70 MHz above the received radio frequency 22', is generated by a VCO 80 that is controlled by the output of a phase lock loop 82 in a manner similar to that used in the transmitter to maintain the VCO output 22''' at a steady, stable, invariable frequency.

Figure 5:
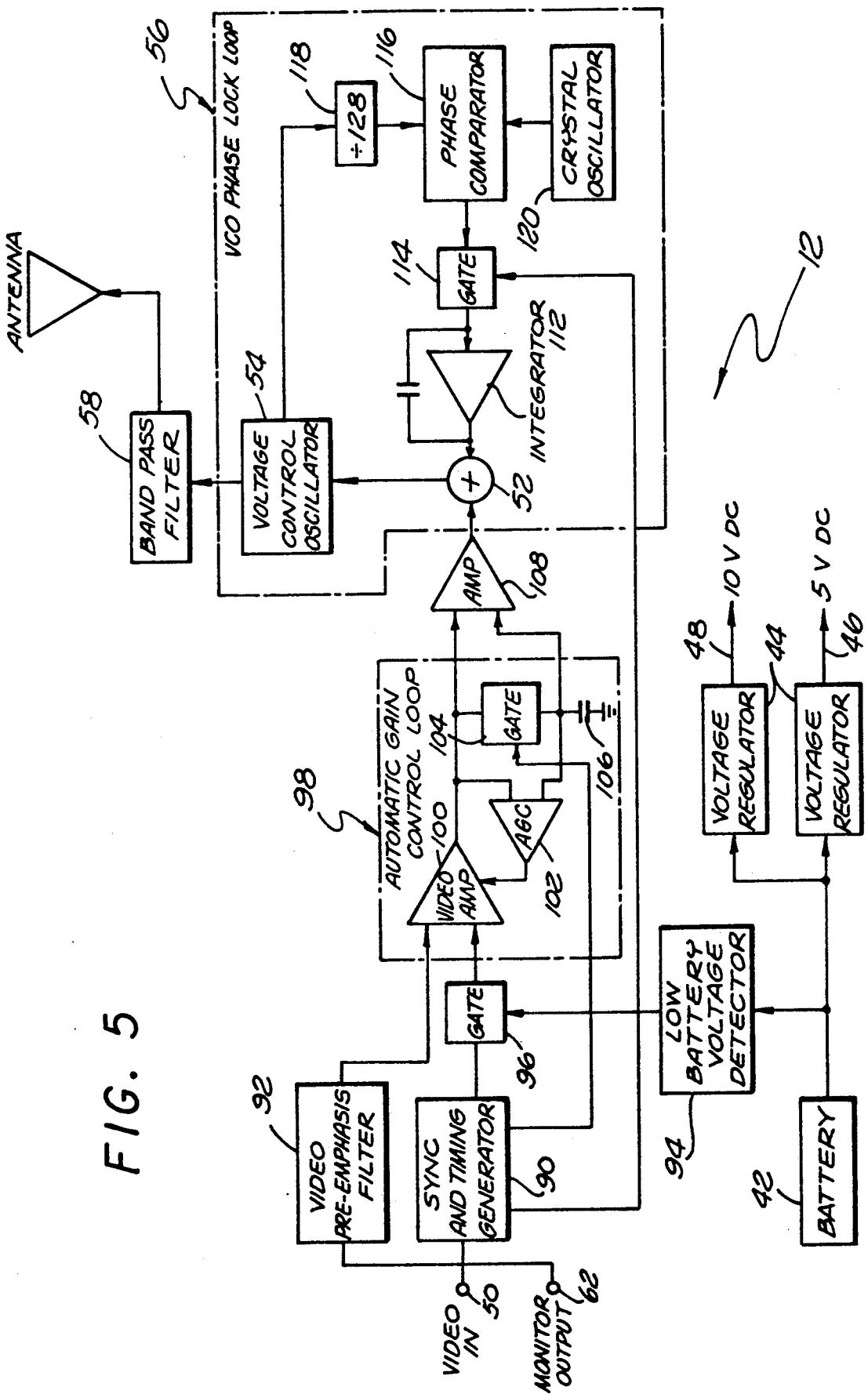
FIG. 5 is a detailed schematic representation of the video transmitter of the wireless real time video system.

Referring to the further detail provided by FIG. 5, the video transmitter 12 is powered by an internal power source 42, in this example a 12-volt battery. This internal power source or battery 42 is further voltage regulated by two regulators 44 that provide a first dc voltage output 46 of 5-volts and second dc voltage output 48 of 10-volts.

A low battery voltage detector 94 is used to detect reduced battery voltage of approximately 11-volts or less. Detection of a low voltage condition causes the low battery voltage detector 94 to trigger a signal to gate 96 to add a fixed low voltage indicator signal at the end of each line at the start of a video frame to produce a small lit square in the upper corner of the video monitor to warn the operator that the battery will soon need to be changed.

The video signal 22' is received at the input 50 from the security camera (not shown here). The monitor output 62 allows one to view a personal monitor which is seen by the video camera. The video input signal is applied to a sync-timing generator 90 and a video pre-emphasis filter 92. The video pre-emphasis filter 92 enhances the signal-to-noise ratio at higher video frequencies in the transmitter and operates in conjunction with a video de-emphasis filter in the receiver that restores the proper frequency response to improve the overall quality of the received picture. The sync and timing generator 90 detects the horizontal sync pulse of the received video input signal, which occurs every time the horizontal sync tip goes to a pre-selected negative level. This sync pulse is then used as a timing means to sample the VCO output for use in the phase lock loop 56 to maintain the VCO output at the selected frequency and thereby control the transmitter bandwidth.

An external gain control regulator 96 can be manually set to compensate for external changes which impact the input signal. The automatic gain control loop 98 incorporates a video amplifier 100 that receives the output from the video pre-emphasis filter 92. The gain of the video amplifier VCO is adjusted by an automatic gain control (AGC) loop 98 to compensate for ambient light variations to which the video camera is exposed. Since is is most important that the picture quality remain constant, the automatic AGC control 102 for the video input to the transmitter and automatic gain control for the receiver output makes the system 10 self adjusting to permit use of a variety of cameras or monitors without time consuming and costly readjustment. For example, in conducting outdoor surveillance, ambient light levels can vary greatly between daylight and night time and the automatic gain control 98 can compensate for these changes. However, if the system 10 is used within a building having a fixed light level, the gain need not be used to maintain a stable video picture.

In operation, video input signal 50 is applied both to the video pre-emphasis filter 92 and the sync and timing generator 90. The video pre-emphasis filter 92 produces an output stripped of the horizontal and vertical sync pulses to be applied as an input to the video amplifier 100. The sync and timing generator 90 produces timing signals to be applied to the gates 96, 104 and 114. Specifically, the sync and timing generator 90 generates a low voltage indicator timing signal that is applied to the gate 96 during a brief interval following each horizontal sync pulse that occurs during a given number of line intervals following a vertical sync pulse. This low voltage timing signal thus opens the gate 96 to apply the output of the low battery voltage detector 94 to the input of the video amplifier 100 at the beginning of each frame to generate a lighted square in one of the upper corners to warn the operator of a low battery voltage condition.

Another output from the sync and timing generator 90 is applied to the gate 104 to enable it during the black level, back porch portion of each horizontal sweep interval, thus short-circuiting the input to the amplifier 108 as well as the input to the automatic gain control amplifier 102. In this way, the output of the automatic gain control amplifier 102 is only affected by the level of the video signal during the video signal intervals, and the base band video modulating signal applied from the output of the amplifier 108 to the summation circuit 52 is held constant during the sync intervals. A capacitor 106 connects one of the inputs to the AGC amplifier 102 and the video amplifier 108 to ground potential and acts as a low pass filter to stabilize these imputs and eliminate any high frequency transients or AC line hum.

Finally, the sync and timing generator 90 generates the timing signal to enable the gate 114 in the phase loop only during the sync pulse intervals so that the frequency of the voltage controlled oscillator 54 is regulated only in accordance with the unmodulated oscillator frequency.

The transmitting antenna 16 consists of a copper plate on an epoxy fiberglass printed circuit board material having a spacing of a half inch above the copper ground plane. This is microstrip patch radiating antenna exhibits circular polarization with a hemispherical radiation pattern with a 3 dB beamwidth of 160°. The gain of the antenna is 2 dB relative to the isotropic linear polarized antenna of the monopole receiver.

As shown in the FIG. 5, the VCO phase lock loop 56 incorporates a varactor turned oscilllator 54 capable of generating a signal in the 902 to 928 MHz frequency band with a second harmonic level of $-20$ dBC. Any other oscillations are in the range of 80 dB. The additional required isolation of harmonic related frequency components is provided to the band pass filter 58 wherein the output of this varactor tuned oscillator 54 (VCO) is 0.5 mW ($-3$dBM).

The phase lock loop 56 in FIG. 5 employs a high speed frequency divider 118 that divides the output frequency from the VCO 80 54 by 128 to produce a signal frequency within the range of the phase lock loop 56 at approximately 7.047 MHz. The phase comparator 116 compares the phase of the output from the divider 118 with the phase of the crystal oscillator 120 to generate an error signal that is applied to the VCO 54 by the integrator 112 through the summer (not shown here) when the gate 114 is enabled to adjust the unmodulated VCO frequency generated during the blanking intervals to match that of the crystal oscillator 120. The frequency stability of the VCO 54 will be directly related to the crystal oscillator 120 stability. In practice, over a temperature range of 0° to 70° centigrade, the frequency stability will be approximately 0.02%.

Preferably, the phase lock loop 56 is gaged "on" only during the black level, back porch part of the video waveform so that the frequency is stabilized without regard to the video content of the video signal. The summer 52 thus combines low frequency phase lock loop information with the higher video frequency information to modulate the carrier frequency The band pass filter 58 preferably consists of a microstrip on G-10 PCB material which provides over 40 dB of harmonic reduction for a resulting harmonic level of less than $-60$ dBC.

Figure 6:
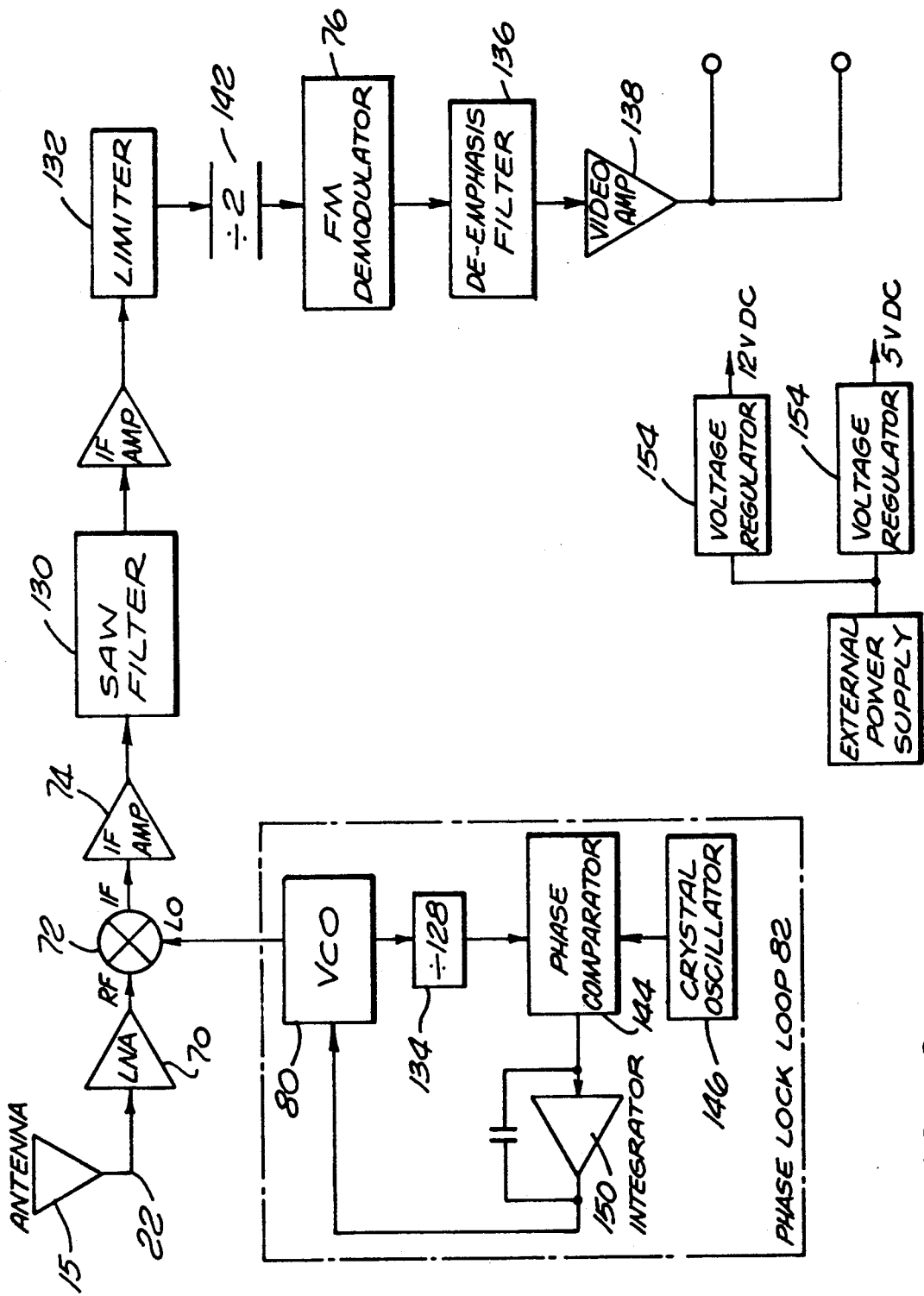
FIG. 6 is a full detail schematic representation of the video receiver of the wireless real time video system.

In the preferred embodiment, a 14-dB video high frequency pre-emphasis filter 92 enhances the signal-to-noise (SNR) ratio of the higher frequency video signals, while the de-emphasis filter 136, shown more clearly in FIG. 6, in the receiver 14 restores the original frequency content to the received video signal 22' to produce the proper frequency response.

Referring now to FIG. 6, the receiver 14 has an antenna 15 which preferably consists of a cap loaded antenna that exhibits vertical polarization with the radome points straight up. The antenna radiation pattern is doughnut shaped with maximum gain to the side lobes. The 3-dB beamwidth is 90° with a gain of 2-dB relative to an isotropic linear polarized antenna. The combination of the transmitting circular polarization antenna, as used in the transmitter radiating to linear polarized antenna, yields a 3-dB reduction in system gain, but provides a significant insurance against gain reduction due to antenna misalignment or multi-path nulls.

The low noise amplifier 70 amplifies the signal 221 received through the pre-selector filter 68 (not shown in FIG. 6) from the antenna 15 to provide a 27-dB gain to establish the noise figure for the receiver. A receiver VCO 80 and phase lock loop 82 are similar in function and configuration to those used in the transmitter 12, except that the frequency is offset by 70 MHz to provide an intermediate frequency for demodulation. The receiver VCO 80 is preferably a varactor tuned oscillator operable in the range of 972 to 998 MHz frequency with a second harmonic level at −20 dB. Any other spurious oscillations are less that 80 dB, and the power output of the VCO is a nominal 6 mW at 8 dB. The phase lock loop 82 consists of a high speed intergrated circuit frequency divider 134 that divides the VCO output by 128. A crystal oscillator 146 generates a 7.661 MHz frequency output that is applied to the phase comparator 144 in the phase lock loop 82 to be compared with the output from the divider 134. The phase error signal from the comparator 144 is applied to the VCO 80 through the integrator 150. the frequency stability of the VCO 80 is directly related to the crystal oscillator's stability which in a temperature range of 0° to 70° C will be 0.02%.

The mixer 72 demodulates the received radio frequency 22' to produce a 70 MHz intermediate frequency (IF) using the local oscillator input from the VCO 80. Preferably, a commercial surface mount mixer module is used. The intermediate frequency signal is amplified by an amplifier 74 to be applied to a surface acoustic wave filter (SAW) filter 130 that limits the band width to 10 dB at ±10 MHz. A limiter 132 is used to limit the signal amplitude so that the demodulation process is not affected by amplitude modulation or spurious AM signals. Another divider 134 is then used to reduce the 70 MHz signal frequency to 35 MHz so as to bring the frequency range down into the acceptable range of the demodulation integrated chip.

The FM demodulator 76 uses a phase lock loop 82 to demodulate the FM information with an internal VCO 80 that generates a nominal 35 MHz output frequency to be phase locked to the input signal using the demodulated FM signal. The de-emphasis filter 136 is preferably a 14 dB video high frequency de-emphasis response that enhances the signal-to-noise ratio of higher video frequencies in order to restore the original frequency content to offset the pre-emphaseis that occurred in the transmitter. The video amplifer 138 amplifies the video signal using a video integrated circuit and discreet transistors to drive the characteristic 75 ohm output impedance. The voltage regulators as shown as 154 provides regulated 5 and 12 voltage taken from a 14-volt direct current voltage source.

The wide band video receiver antenna 15, which is a cap loaded monopole antenna that exhbits vertical polarization with the radome point straight up, has a nominal impedance of 50 ohms. The video receiver antenna 15 is formed with a copper clad ground plane on an epoxy fiberglass substrate. The 50 ohm feed point attaches to a loaded monopole that is approximately 1.1875 inches in length. The monopole antenna terminates with a 1.1875 inch brass plate, and has a copper radiating element 0.9375 inches in length beneath the loaded dipole on the copper clad ground plane.

In contrast, the wide band video transmitter microstrip patch radiating antenna 16 (not shown here) provides circular polarization (axial ratio) in both the (x) and (y) axis by locating a slot of predetermined length and width within a microstrip patch radiating element, which give minimal impedance of this antenna is 50 ohms.

The guidelines used to design the microstrip wide band video transmitter patch radiating antenna requires a knowledge of the width of the band at which the patch will be transmitting. To transmit in the 902 to 928 Mhz frequency range with a 26 MHz of bandwidth, the patch is raised above the ground plane approximately one half inch. The height of the radiating element controls the bandwidth of the transmitted signal.

Microstrip antennas are usually designed to transmit between 1 to 2 MHz of bandwidth. Patch radiating antennas have not been used extensively to transmit wideband video at high carrier frequencies. The radiating patch of the antenna is size constrained by the frequencies the antenna will broadcast. Approximation of the patch size is optimized through experimentation during the design phase.

The feedpoint of the patch radiating antenna of this invention is also determined through optimization by experimentation. The feed point to the radiating patch for this transmitter must produce for a transmitter operable at 50 ohms. Maximum power radiation and transference is achieved by designing the patch radiating antenna with a standing wave ration (SWR) of less than 2:1.

The slot for this patch radiating antenna results in circular polarization so that the energy is transmitted equally in both the horizontal and vertical planes. Whereas most circular polarized antennas are either left hand or right hand polarized when configured in a printed microstrip requiring two distinct feed points, the patch radiating antenna used in the preferred embodiment achieves circular polarization with only one feed point using the slot within the patch.

Figure 7:
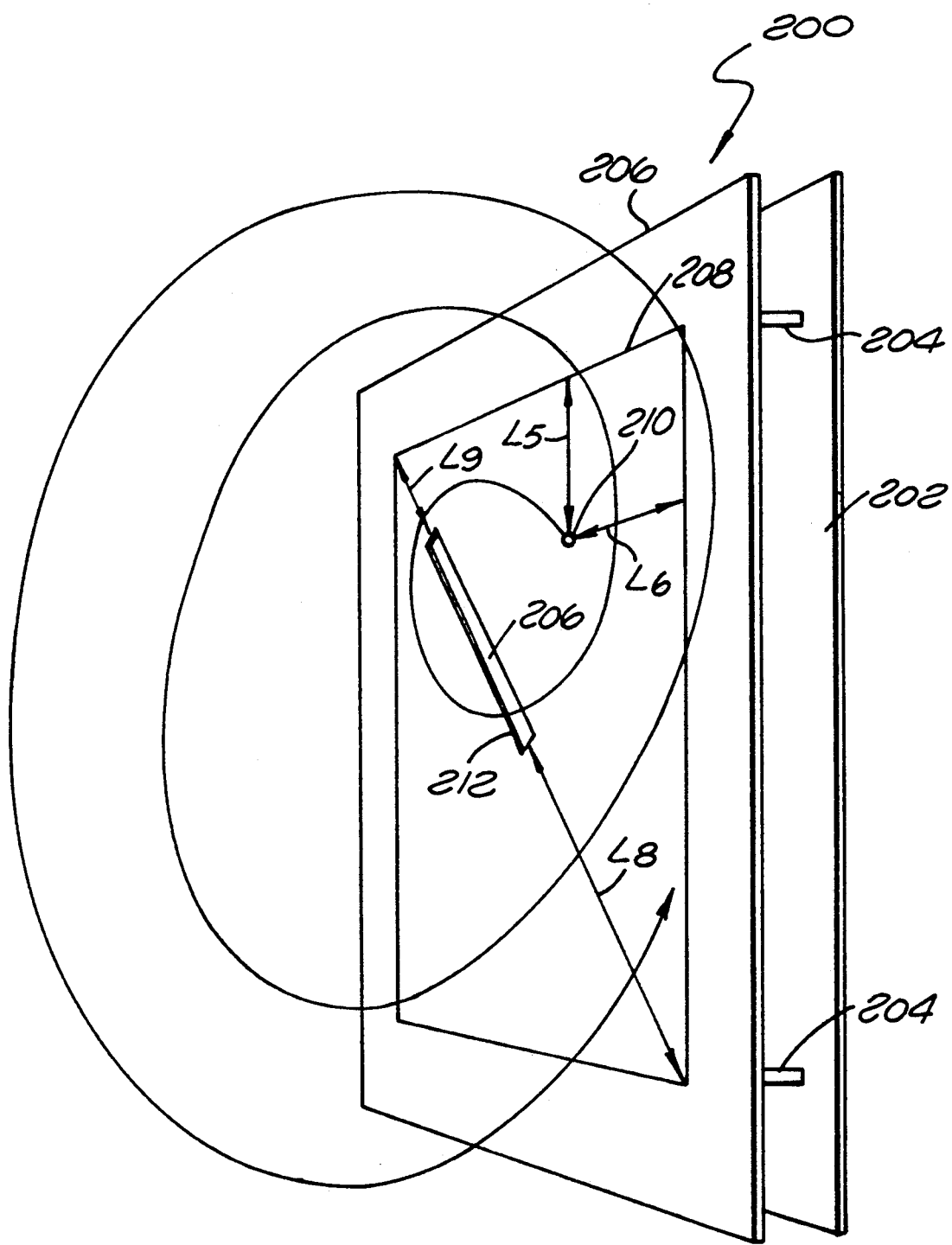
FIG. 7 is a schematic orthogonal representation view of the wide band video transmitter microstrip patch radiating antenna operable for use with the video transmitter of the wireless real time video system.

FIG. 7 is a schamatic representation orthogonal view of the wide band video trnsmitter antenna 200 used with the wireless video system 10. The antenna 200 has a copper ground plane 202 formed on a glass epoxy board substrate 206 separated by nylon spacers 204. The radiating element or patch 208 is, in this example, a copper plate. A 50 ohm feed point 210 is shown positioned at a specific distante L5 and L6 from one corner of the plate. For a patch radiating antenna 200 operable in the prescribed video range, L5 is 0.970 inches and L6 is 2.200 inches. The slot 212 is cut through the radiating element or patch 208 to the exposed board 206 below. This slot 212 is specifically placed within the radiating element or patch 208, a distance L9 and L8 from two outside corners of the radiating element or patch 208. The distance L8 is 3.375 inches and L9 is 0.9375 inches, in this example.

The tansmitted video signal 22 as shown in FIG. 1, from the patch 208 is equally in phase both vertically and horizontally.

In one specific example, the antenna 200 is a printed pattern on a G10 expsy fiberglass printed circuit board 206 having a spacing of ⅛" above the copper ground plane 202. This antenna 200 exhibits circular polarization with the hemispherical radiation pattern above the antenna 200 with the 3 dB beam width of 160°. The gain of the antenna is 2 dB relative to an isotropic linear polarized antenna as used in the receiver. The receiver antenna is a cap loaded monopole antenna that exhibits vertical polarization when the antenna is pointed straight up. In this embodiment for wireless video transmission at 902 to 928 MHz, the patch is 5 inches by 5 inches while the ground plate and support is approximately 7 inches by 7 inches.

The range of the wireless system as shown in the accompanying drawings may be calculated from the radar one-way range equation:

$$Pr/Pt = Gr/Gt\Omega^2/(4\pi R)^2$$

Where:
Pr = power received;
Pt = −3 dBm (0.5 milliwatts), power transmitted;
Gr = 2 dB, gain of the receiver antenna;
Gt = 2 dB, gain of the transmitter antenna;
π = 1.09 feet, wavelength at 902 MHz; and
R = range distance between the transmitter and the receiver.

Knowing that the minimum power received must equal the minimum signal to the noise ratio (SNR) for a frequency modulated system, the minimum signal to noise ratio is 7 dB. Also the noise figure must be known and is determined by the signal band which is a 4 MHz for the overall system. The noise figure will therefore be −101.8 dBm.

Solving the equation for the range yields 5.360 feet or 1.632 meters for the portable system operating distance, having a power density of:

$$S = \frac{Gt/Pt}{4\pi R^2} = 6.6 \,\mu W/m^2 \; @ \; 3m$$

Electrical field strength for this antenna is calculated by:

$$E = 120\pi S = 0.05 \; V/m \; at \; 3 \; m$$

While particular embodiments of the invention have been shown and described, it will be obvious to those skilled in the art that changes and modifications may be made without departing from the invention in its broader aspects and therefore the aim in the appended claims is to cover all such changes and modifications as followed in the true spirit and scope of the invention.

We claim:

1. A wireless video surveillance system, comprising:
  a video camera for generating a base band video signal;
  a transmitter for receiving said base band video signal from said video camera, including means for directly modulating a carrier signal at a substantially fixed carrier frequency within an assigned radio frequency transmission band to generate a narrow band frequency modulated transmission signal and a transmitter antenna means having a microstrip patch radiating antenna for transmitting said frequency modulated transmission signal;
  a receiver means including a receiving antenna for receiving said frequency modulated tansmission signal radiated from said transmitting antenna means and a demodulator means for deriving said base band video signal from the frequency modulated transmission signal; and
  a remote monitoring station having a video monitor or recorder connected to receive said base band video from said receiver means.

2. The wireless video surveillance system of claim 1 wherein said carrier signal is within the assigned frequency range of 902 to 928 MHz.

3. The wireless video surveillance system of claim 1 wherein said carrier signal is within the assigned frequency range of 2,400 to 2,500 MHz.

4. The wireless video surveillance system of claim 1 wherein said carrier signal is within the assigned frequency range of 5,700 to 5,900 MHz.

5. The wireless video surveillance system of claim 1 wherein the transmitter includes:
  a voltage controlled oscillator for generating the frequency modulated transmission signal in response to the amplitude of an applied control signal;
  a crystal oscillator for generating a precise submultiple of said fixed carrier frequency with minimal harmonic generation;
  a phase lock for comparing a submultiple of the transmission signal from the voltage controlled oscillator with the submultiple of the carrier signal generated by the crystal oscillator during the blanking intervals of said base band video signal to produce a phase error output signal; and
  a summer circuit for combining the amplitude of said phase error output signal with the base band video signal during non-blanking intervals to generate the control signal applied to said voltage controlled oscillator to frequency modulate the output of said voltage controlled oscillator in accordance with the base band video.

6. The video surveillance system of claim 5 wherein a narrow band pass filter receives the frequency modulated transmission signal from the voltage controlled oscillator to be applied to said transmitter antenna means for transmission to said receiver means.

7. The wireless video surveillance system of claim 6 wherein crystal oscillator includes a crystal diode operable to generate a frequency reference signal at a precise submitiple of the carrier frequency, and a frequency divider connected tp receive the transmission signal generated by the voltage controlled oscillator to produce a submultiple to be compared in phase with the frequency reference signal of said crystal oscillator, thereby minimizing side band transmission, and wherein the narrow band pass filter consists of a microstrip material to maximize harmonic reduction.

8. The wireless video surveillance system of claim 6 wherein said transmitter includes an automatic gain control circuit for maintaining the amplitude of said video signal applied to the summer circuit at a constant level of compensate for ambient light changes within the camera field of view.

9. A wireless video surveillance system comprising:
  a remote video camera for generating a base and video signal;

transmitter means connected to said video camera including modulation means for directly modulating a radio frequency carrier signal with said base and video signal to generate a narrow band frequency modulated transmission signal and a transmitter antenna for radiating said transmission signal; and a centrally located receiver means including a receiving antenna for picking up the radiated transmission signal from said transmitter means and a demodulator means for deriving said base band video signal from the transmission signal received by said receiving antenna to be applied to a video monitor or recorder.

10. The wireless video surveillance system of claim 9 wherein said transmitter antenna is circularly polarized.

11. The wireless video surveillance system of claim 10 wherein said circularly polarized transmitter antenna consists of a single microstrip patch.

12. The wireless video surveillance system of claim 11 wherein:

the single microstrip patch consists of a unitary conductive strip spaced a predetermined distance from a conductive ground plane and having a slotted portion and a single feed point spaced inwardly at predetermined locations, whereby the dimensions of the microstrip patch and the spacing of its slotted portion and feed point are predetermined to operate at the carrier frequency of the transmission signal.

13. The wireless video surveillance system of claim 10 wherein the receiving antenna is monopole antenna having vertical polarization.

14. The wireless video surveillance system of claim 9 wherein:

said modulation means includes a voltage controlled oscillator that operates only blanking intervals of the video signal from the video camera to generate said transmission signal at a substantially constant radio carrier frequency and operates outside of the blanking intervals to receive the base band video signal form said camera as a control voltage to produce narrow band frequency modulation of said radio carrier frequency.

15. The wireless video surveillance system of claim 14 wherein said transmitter means further comprises;

a crystal oscillator for generating frequency reference at a precise submultiple of said radio carrier frequency; and a phase lock loop operative during the blanking intervals of said video signal for comparing the transmission signal from said voltage controlled oscillator with the frequency reference signal generated by the crystal oscillator to produce a phase error signal for adjusting the frequency of the transmission signal generated by said voltage controlled oscillator to the precise radio carrier frequency.

16. The wireless video surveillance system of claim 15 wherein:

said transmitter means includes a high speed frequency divider for stepping down the frequency of the transmission signal from the voltage controlled oscillator to match the frequency of the crystal oscillator so as to minimize side band transmissions due to harmonic generation.

17. The wireless video surveillance system of claim 16 wherein said narrow band pass filter consists of a microstrip element providing 40 dB harmonic reduction.

18. The wireless video surveillance system of claims 14 or 17 wherein said transmitter means includes an automatic gain control circuit for maintaining the amplitude of said base band video signal applied to said voltage controlled oscillator at a constant level to compensate for ambient light changes within the camera field or view, whereby modulation of the carrier frequency is maintained within narrow frequency band limits.

19. The wireless video surveillance system of claims 9 or 17 wherein teh receiver means includes a narrow band pre-selector filter for eliminating noise from the signal received by said receiver antenna.

20. The wireless video surveillance system of claim 9 wherein the demodulator means includes a voltage controlled oscillator for generating a mixing frequency signal offset from the fixed carrier frequency by approximately 70 MHZ to be mixed with the signal from said receiving antenna to generate an intermediate frequency output to be applied to said demodulator means for deriving said base band video signal.

21. The wireless video surveillance system of claim wherein the receiver means includes a mixer for combining the signal from said receiving antenna with the mixing frequency signal to generate the intermediate frequency output and further including a narrow band SAW filter to minimize the bandwidth of the intermediate frequency output applied to the demodulator means to derive the base band video signal.

22. The wireless video surveillance system of claim 18 wherein the demodulator means includes a voltage controlled oscillator for generating a mixing frequency signal offsert from the fixed carrier frequency by approximaterly 70 MHZ to be mixed with the signal from said receiving antenna to generate an intermediate frequency output to be applied to said demodulator means for deriving said base band video signal.

23. The wireless video surveillance system of claim 19 wherein the demodulator means includes a voltage controlled oscillator for generating a mixing frequency signal offset from the fixed carrier frequency by approximately 70 MHZ to be mixed with the signal from said receiving antenna to generate an intermediate frequency output to be applied to said demodultor means for deriving said base band video signal.

24. The wireless video surveillance system of claim 23 wherein the receiver means includes a mixer for combining the signal from said receiving antenna with the mixing frequency signal to generate the intermediate frequency output and further including a narrow band SAW filter to minimize the bandwith of the intermediate frequency output applied to the demodulater means to derive the base band video signal.

* * * * *

UNITED STATES PATENT AND TRADEMARK OFFICE
CERTIFICATE OF CORRECTION

PATENT NO. : 5,128,755

DATED : July 7, 1992

INVENTOR(S) : Philip D. Fancher

It is certified that error appears in the above-identified patent and that said Letters Patent is hereby corrected as shown below:

In the abstract, line 12, after "quency" insert --to generate an intermediate frequency--.

Column 1, line 22, correct "protable" to --portable--.

Column 3, line 21, change "lower" to --low--; and insert --it-- after "that".

Column 4, line 3, change "(PPL)" to --(PLL)--.

Column 4, line 16, delete "kept".

Column 5, line 36, delete first "is" and insert --it--.

Column 6, line 23, delete "is".

Column 6, line 27, delete "the" (first occurrence).

Column 6, line 28, delete "turned" and insert --tuned--; and correct spelling of "oscillation".

Column 6, line 33, delete "to" and insert --by--.

Column 6, line 38, delete "80".

Column 6, line 53, delete "gaged" and insert --gated--.

Column 6, line 64, move comma over.

Column 7, line 15, change "221" to --22'--.

Column 7, line 28, delete "intergrated" and insert --integrated--.

Column 7, line 36, second occurrence change "the" to --The--.

UNITED STATES PATENT AND TRADEMARK OFFICE
CERTIFICATE OF CORRECTION

PATENT NO. : 5,128,755

DATED : July 7, 1992

INVENTOR(S) : Philip D. Fancher

It is certified that error appears in the above-identified patent and that said Letters Patent is hereby corrected as shown below:

Column 7, line 62, correct "pre-emphaseis" to --pre-emphasis--.
Column 7, line 63, correct "amplifer" to --amplifier--.
Column 7, line 67, change "voltage" to --voltages--.
Column 8, line 2, correct "exhbits" to --exhibits--.
Column 8, line 17, change "give" to --gives--.
Column 8, line 23, change "Mhz" to --MHz--.
Column 8, line 41, change "ration" to --ratio--.
Column 8, line 52, change "schamatic" to --schematic--.
Column 8, line 53, change "trnsmitter" to --transmitter--.
Column 8, line 59, change "distante" to --distance--.
Column 9, line 1, change "tansmitted" to --transmitted--.
Column 9, line 5, change "expsy" to --epoxy--.
Column 9, line 39, change "5.360" to --5,360--.
Column 9, line 40, change "1.632" to --1,632--.
Column 10, line 4, change "tansmission" to --transmission--.
Column 10, line 30, add --loop-- after "lock".
Column 10, line 53, delete "tp" and add --to--.
Column 10, line 64, delete "of" and add --to--.

UNITED STATES PATENT AND TRADEMARK OFFICE
CERTIFICATE OF CORRECTION

PATENT NO. : 5,128,755

DATED : July 7, 1992

INVENTOR(S) : Philip D. Fancher

It is certified that error appears in the above-identified patent and that said Letters Patent is hereby corrected as shown below:

Column 10, line 67, change "and" to --band--.
Column 11, line 4, change "and" to --band--.
Column 11, line 32, after "is" insert --a--.
Column 11, line 37, after "only" insert --during--.
Column 11, line 42, change "form" to --from--.
Column 12, line 14, change "or" to --of--.
Column 12, line 18, change "teh" to --the--.
Column 12, line 29, after "claim" insert --22--.
Column 12, line 42, change "imaterly" to --imately--.

Signed and Sealed this

Twenty-first Day of September, 1993

Attest:

BRUCE LEHMAN

Attesting Officer

Commissioner of Patents and Trademarks

US005128755B1

REEXAMINATION CERTIFICATE (3754th)

United States Patent [19]

Fancher

[11] B1 5,128,755

[45] Certificate Issued Mar. 23, 1999

[54] WIRELESS REAL TIME VIDEO SYSTEM AND METHOD OF MAKING THE SAME

[75] Inventor: Philip D. Fancher, Channel Islands, Calif.

[73] Assignee: Wireless Technology, Inc., Las Vegas, Nev.

Reexamination Request:
No. 90/004,389, Sep. 27, 1996

Reexamination Certificate for:
Patent No.: 5,128,755
Issued: Jul. 7, 1992
Appl. No.: 557,896
Filed: Jul. 25, 1990

Certificate of Correction issued Sep. 21, 1992.

[51] Int. Cl.[6] ............................................. H04N 7/18
[52] U.S. Cl. ............................. 348/158; 348/724
[58] Field of Search ................. 348/61, 143, 151, 348/158, 152, 469, 723, 724; 343/700 MS; 455/66

[56] References Cited

PUBLICATIONS

Stevens et al. Frequency–modulated Amateur Television (FMTV) 1987; The 1987 AARL Handbook, Sixty–fourth–Edition—Chapter 20; pp. 20–8 to 20–15.

Woodling—"A 24 cm FM Transmitter" 1989; The ATV Compendium The British Amateur Television Club, pp. 75–82.

*Primary Examiner*—Victor R. Kostak

[57] ABSTRACT

A wireless, real time video system provides a low power video transmitter wherein the base band video signal generated by the video camera directly modulates a radio frequency carrier signal to produce a very narrow band transmitter signal that is transmitted through a circularly polarized patch radiating antenna to a receiving antenna at a remote receiver site. The transmitted signal is picked up by the receiver antenna to be passed through a narrow band preselector filter to a low noise amplifier. The amplified signal is then applied to a mixer along with a fixed local oscillator frequency that is demodulated to reconstruct the original base band video signal for use in operating a video monitor or recorder connected by hard wired cable to the receiver unit. Both the transmitter and the receiver employ a phase locked loop and narrow ban filters to confine the transmitted signal and the receiver response within a very narrow frequency band to optimize the transmitter efficiency and prevent generation of and interference from extraneous signals.

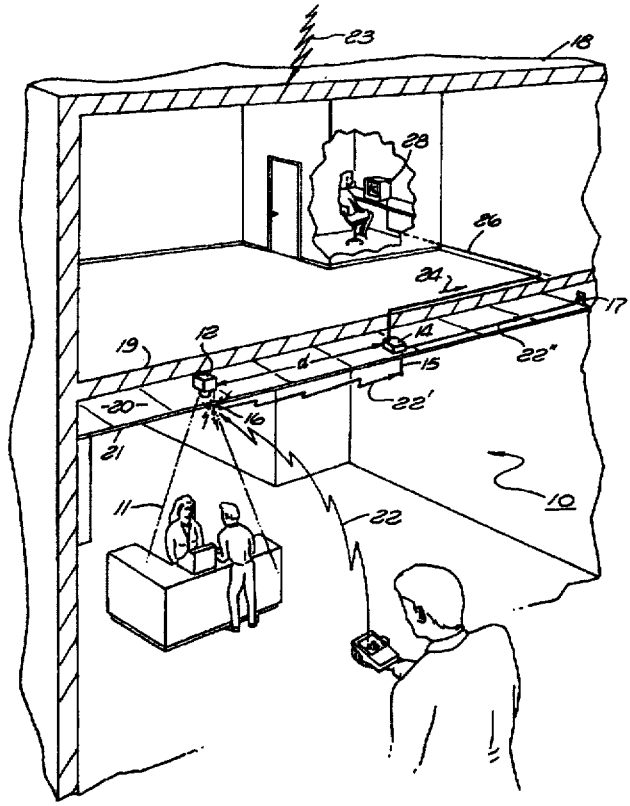

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-24 is confirmed.

* * * * *